United States Patent [19]
Wadman et al.

[11] Patent Number: 5,528,579
[45] Date of Patent: Jun. 18, 1996

[54] ADDED BIT SIGNALLING IN A TELECOMMUNICATIONS SYSTEM

[75] Inventors: Mark S. Wadman, St. Paul; Adam Opoczynski, Eden Prairie; Mark D. Elpers, Elk River, all of Minn.

[73] Assignee: ADC Telecommunications, Inc., Minneapolis, Minn.

[21] Appl. No.: 75,638

[22] Filed: Jun. 11, 1993

[51] Int. Cl.⁶ ........................................ H04J 3/14
[52] U.S. Cl. ............... 370/15; 370/83; 370/110.1
[58] Field of Search .................... 370/84, 100.1, 370/110.1, 15, 105.1, 105.2, 83, 99; 375/105, 111

[56] References Cited

U.S. PATENT DOCUMENTS

| | | | |
|---|---|---|---|
| 3,787,613 | 1/1974 | Farmer et al. | 340/173.2 |
| 4,245,340 | 1/1981 | Landry | 370/111 |

(List continued on next page.)

FOREIGN PATENT DOCUMENTS

| | | |
|---|---|---|
| 1204230 | 5/1986 | Canada . |
| 2002295 | 5/1990 | Canada . |
| 2008900 | 10/1990 | Canada . |
| 0162994 | 5/1984 | European Pat. Off. . |
| 0318333A1 | 5/1989 | European Pat. Off. . |
| 0411597A2 | 2/1991 | European Pat. Off. . |
| 0425732A1 | 5/1991 | European Pat. Off. . |
| 0472824A1 | 3/1992 | European Pat. Off. . |
| 3403206A1 | 8/1985 | Germany . |
| 4125075A1 | 3/1992 | Germany . |
| 88/05233 | 7/1988 | WIPO . |
| 89/05070 | 6/1989 | WIPO . |
| 91/11867 | 8/1991 | WIPO . |
| 92/07432 | 4/1992 | WIPO . |
| 92/10036 | 6/1992 | WIPO . |

OTHER PUBLICATIONS

The Institute of Electrical and Electronics Engineers Inc. UK & RI Section SP/COM Chapter. Programme and Abstracts for IEEE Workshop on Passive Optical Networks for the Local Loop. Heathrow Penta Hotel, London 8th–9th May 1990. Sponsors IEEE UK & RI Section and Optical Communcations Committee of IEEE Communcations Society in associated with IEEE.

(List continued on next page.)

Primary Examiner—Douglas W. Olms
Assistant Examiner—Ajit Patel
Attorney, Agent, or Firm—Schwegman, Lundberg & Woessner

[57] ABSTRACT

A telecommunications system includes an added bit signalling method and apparatus for conveying signalling information between a head end and multiple remote ends connected over a passive distribution network. In accordance with the present invention, an added bit having an identifiable data sequence patterned thereon is appended to each channel within a succession of frames. In the system, the modified channels are broken up, routed reconstructed into a modified framing format and transmitted to their respective destination remote units. Because individual channels within a given frame are broken up and reconstructed into modified frames with channels from other frames, the framing information formerly identified by the framing bit is lost. The present invention therefore appends an added-bit sequence to each channel such that each channel sample carries its own multiframe and alignment information. The remote ends monitor the added bits to locate multiframing and alignment information and to identify individual time slots within each frame. The receiving equipment loops the added bit signal back to the transmitting equipment in the upstream data path. The head end monitors the looped back added bit pattern to ensure the integrity of the outgoing and return data paths. The added bit can be further utilized for out-of-band signalling or to provide an additional data link.

16 Claims, 9 Drawing Sheets

U.S. PATENT DOCUMENTS

| | | | |
|---|---|---|---|
| 4,316,284 | 2/1982 | Howson | 375/108 |
| 4,316,285 | 2/1982 | Bobilin et al. | 375/108 |
| 4,397,020 | 8/1983 | Howson | 375/108 |
| 4,642,806 | 2/1987 | Hewitt et al. | 370/95.1 |
| 4,644,535 | 2/1987 | Johnson et al. | 370/99 |
| 4,651,330 | 3/1987 | Ballance | 375/108 |
| 4,734,764 | 3/1988 | Pocock et al. | 358/86 |
| 4,779,269 | 10/1988 | Bouillot et al. | 370/110.1 |
| 4,977,593 | 12/1990 | Ballance | 380/2 |
| 4,979,169 | 12/1990 | Almond et al. | 370/105.1 |
| 5,063,595 | 11/1991 | Ballance | 380/2 |
| 5,086,470 | 2/1992 | Ballance | 370/95.3 |
| 5,111,497 | 5/1992 | Bliven et al. | 370/14 |
| 5,142,532 | 8/1992 | Adams | 370/94.1 |
| 5,173,899 | 12/1992 | Ballance | 370/108 |
| 5,263,028 | 11/1993 | Borgnis et al. | 370/105.1 |

OTHER PUBLICATIONS

The Design of a TDMA System for Passive Optical Networks, by D. E. A. Clark et al., British Telecom Research Laboratories, Martlesham Heath, U.K. (1990 IEEE).

The Provision of Telephony Over Passive Optical Networks. C. E. Hoppitt and D. E. A. Clarke. Br. Telecom Technol—vol. 7, No. 2—Apr. 1989.

"Digital Loop Carrier System Technical Manual," *Lynch® Communication Systems SYSTEM300*, 300s–103A, Issue 2, © 1987, Printed: Aug. 1986, Revised: Apr. 1987.

ADDED BIT SIGNALLING IN A TELECOMMUNICATIONS SYSTEM

FIELD OF THE INVENTION

This invention relates generally to the field of communication systems, and more specifically to a method of conveying timing and signalling information between transmitting and receiving telecommunications equipment via an additional bit appended to each n-bit channel sample.

BACKGROUND OF THE INVENTION

T1 is a standard for digital transmission in North America and is used primarily to provide telephone services across remote distances. The T1 digital transmission link has a capacity of 1.544 Mbps (1.544 mega bits per second). In most T1 telecommunications systems, 24 voice channels (conversations) are sampled at an 8 kHz rate, with 8 bits per sample (each 8 bit conversation sample is termed a "DS0"). The twenty-four 8 bit samples are time division multiplexed (TDM) together to create a frame (a "DS1"). To identify individual time slots within a TDM frame, a framing bit having an identifiable data sequence patterned thereon is appended to each frame. The frames are commonly strung together in various formats to create superframes. The Superframe (SF) and Extended Superframe (ESF) formats are two well known examples of widely used framing formats.

Existing telecommunications systems are mostly comprised of copper wire in the subscriber loop. Today, however, many passive distribution media are becoming more viable as an alternative to copper wire. For example, maturing fiber optic technology is making it possible to cost effectively deploy optical fiber in the subscriber loop. One such system employing optical fiber is disclosed in U.S. Pat. No. 4,977,593 to Ballance, issued Dec. 11, 1990, and assigned to British Telecommunications, which is incorporated herein by reference. Optical fiber as a transmission medium provides numerous advantages. Optical fiber provides a noise-free signal transmission environment, is resistant to electromagnetic interference, generates no electromagnetic interference which could initiate crosstalk, and supports very high transmission rates. In addition, optical fiber offers additional potential for future upgrades such as supplying broadband services which are not transmittable over copper wire.

However in systems employing passive distribution networks, the signals are reframed using a modified framing format. In so doing, each DS0 is no longer associated with its DS1 framing bit. A different mechanism for conveying multiframe and alignment information is therefore required.

SUMMARY

To overcome the deficiencies in the art described above, the present invention provides a signalling system to convey multiframe timing and alignment information between transmitting and receiving telecommunications equipment. The transmitting and receiving equipment are connected with a Passive Distribution Network (PDN). In accordance with the present invention, an additional bit having an identifiable data sequence patterned thereon is appended to each n-bit channel sample. The modified channels are transmitted to the appropriate receiving equipment in a modified framing format. The receiving equipment monitors the added bit to locate multiframing information and to identify individual time slots within each frame. The receiving equipment loops the added bit signal back to the transmitting equipment, which monitors the added bit pattern to locate multiframing information and also to ensure the integrity of the outgoing and return data paths in the fiber loop. The added bit can be further utilized for out-of-band signalling or to provide an additional data link.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. This embodiment is described in sufficient detail to enable one skilled in the art to make and use the invention. It will be understood that other embodiments may be utilized and that structural changes may be made without departing from the spirit and scope of the present invention. The following detailed description is therefore not to be taken in a limiting sense, and the scope of the invention is to be defined by the appended claims.

Network Topology

Figure 1:
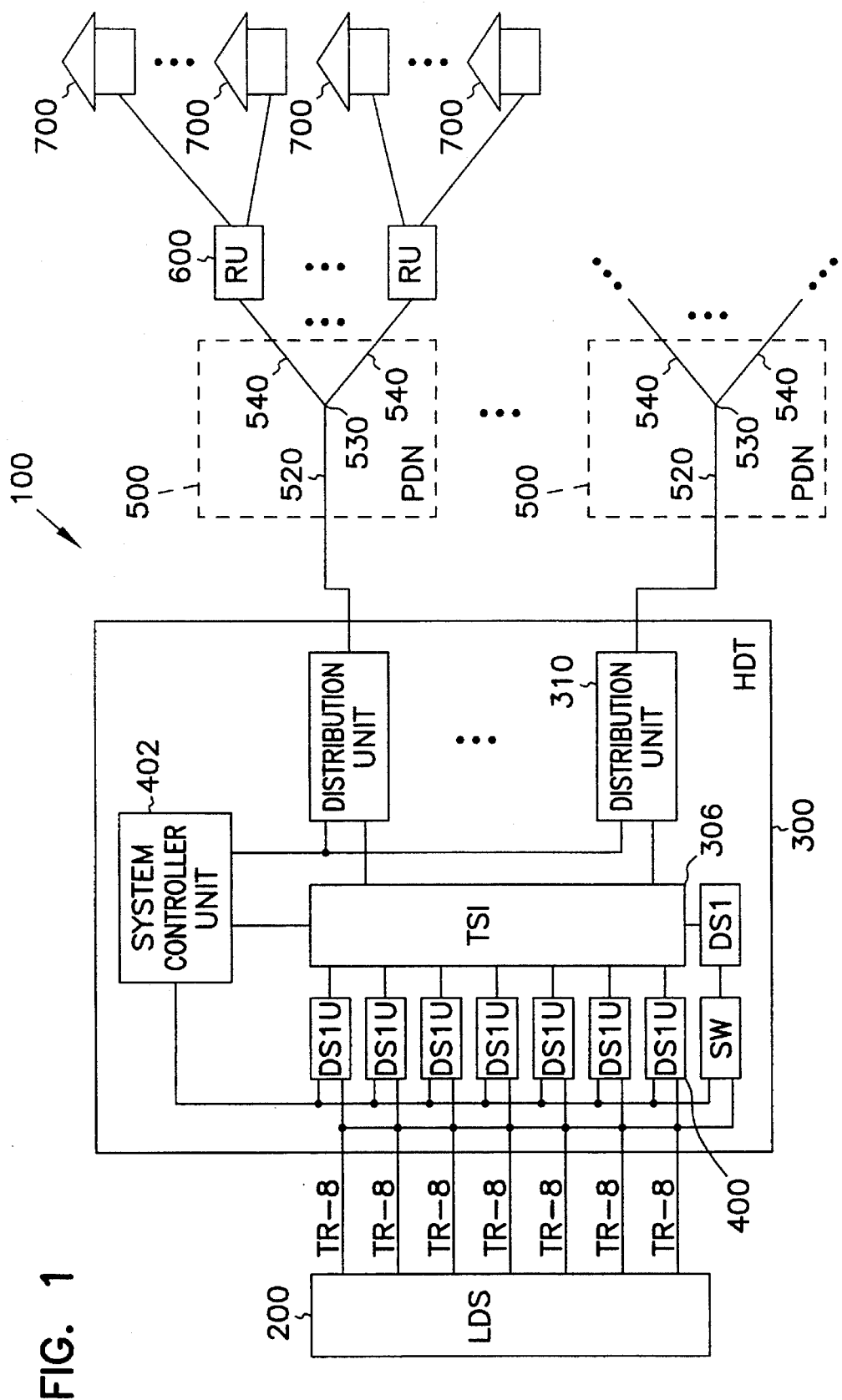
FIG. 1 shows a representative telecommunications system in block diagram form.

A general description of an exemplary telecommunications system with which the present signalling system is used will now be given. FIG. 1 shows a representative telecommunications system 100 in block diagram form. It shall be understood that other configurations and topologies are possible without departing from the scope of the present invention.

The system includes a Host Distribution Terminal (HDT) 300, which interfaces between a Local Digital Switch (LDS) 200 and multiple Passive Distribution Networks (PDN's) 500. In the preferred embodiment, HDT 300 receives and transmits signals to LDS 200 using the conventional and well-known transmission format described in Bellcore document TR-TSY-000008 or the TR-8 transmission format. The primary signal carried over this format is a DS1 signal, and the transmission system is the conventional T1 digital transmission system. As described above, a DS1 signal consists of 24 multiplexed eight-bit channel samples and one framing bit. Each eight-bit channel sample, or DS0, represents an individual channel (a telephone conversation, for example). Because each DS0 is 8 bits wide, the additional bit appended to each DS0 in accordance with the present signalling system is referred to herein as the Ninth Bit Signal, or "NBS". Although the present signalling system is described herein with respect to the DS1/DS0 framing format, it shall be understood that the present signalling system is also adaptable for use with other signalling formats such as DS2, DS3, CEPT or other appropriate channelized signalling format. It could also be used with sampling formats which make use of channel samples of more or less than eight bits. The term "Ninth Bit Signal" as used herein is therefore not to be taken in a limiting sense, but will be used for discussion purposes in connection with the preferred embodiment.

Referring again to FIG. 1, HDT 300 includes a system controller unit 402, which controls operation of functions in HDT 300. System controller unit 402 includes a processing unit and software routines for processing and sending control signals to the hardware in HDT 300 and also includes software routines for error and interrupt handling and other system control functions. HDT 300 also includes several DS1 Units (DS1U) 400. DS1U's 400 provide the termination point for TR-8 lines coming into HDT 300 and rate adapt the TR-8 signals from LDS 200 from 1.544 MHz to 2.56 MHz. DS1U's 400 also perform the format conversion from TR-8 format to the ninth bit signalling format of the present signalling system.

Distribution Units (DU) 310 interface between HDT 300 and PON's 500. In the case of a passive optical network being used for PDN 500, FUs 310 perform electrical-to-optical and optical-to-electrical conversion of the signals in the HDT to subscriber (downstream) and subscriber to HDT (downstream) directions, respectively.

The signals are transmitted over PDN's 500 to a series of Remote Units (RU) 600. Each PDN 500 is preferably a branched point-to-multipoint fiber optic network. However, it shall be understood that other passive distribution media could also be used. PDN's 500 are preferably arranged for fully bidirectional operation. In a first configuration, each PDN 500 includes separate downstream and upstream links for carrying data traffic in the downstream and upstream directions respectively. In an alternate configuration, PDN's 500 include fully duplexed links for bidirectional operation. It shall be understood that the specific PDN configuration does not limit the scope of the present signalling system.

Each RU 600 receives a link from one of the PDN's 500 and thereby the corresponding TDM signal broadcast from HDT 300. RU's 600 access the particular TDM timeslots intended for that destination plus any associated signalling channels. Subscribers 700 transmit speech or data back to RU 600 for transmission back to HDT 300. Each RU 600 thus includes terminations for various cabling, electronics for signal conversion between PDN media and subscriber in-house wiring, and electronics for multiplexing, digital-to-analog conversion, signalling and testing. RU's 600 can be physically located at each individual subscriber 700 or shared between multiple subscribers (as shown in FIG. 1), in which case each RU is located at the curbside and houses the interface to multiple subscriber in-house telephone lines.

Framing Formats

Although the SF and ESF framing formats are well-known to those of skill in the art, the SF format will be described for purposes of illustration and clarity. The framing structure of the superframe (SF) framing format is as follows:

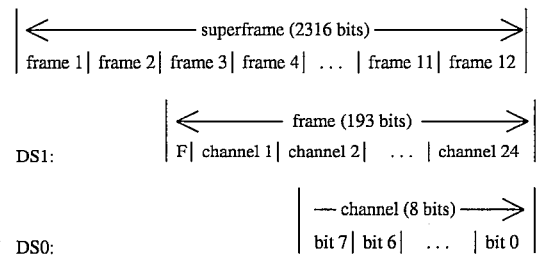

As shown above, SF is formed of 12 DS1 frames, wherein each DS1 frame including 24 8-bit channel samples (DS0) and one framing bit. Table 1 shows that the A and B SF in-band signalling bits are located in the sixth and twelfth frames.

TABLE 1

| FRAME # | Ft BITS 1st bit, odd frms | Fs BITS 1st bit, even frms | SIG. BITS 8th bit, each chn, mult of 6th frms |
|---|---|---|---|
| 1 | 1 | | |
| 2 | | 0 | |
| 3 | 0 | | |
| 4 | | 0 | |
| 5 | 1 | | |
| 6 | | 1 | A |
| 7 | 0 | | |
| 8 | | 1 | |
| 9 | 1 | | |
| 10 | | 1 | |
| 11 | 0 | | |
| 12 | | 0 | B |

NBS Signalling

In most systems employing passive distribution networks in the subscriber loop, the signals transmitted between HDT and RU's 600 are not sent over PDN's 500 in TR-8 format. Instead an internal framing format is necessary to transmit information particular to transmission over PDN's. In addition, because each DS0 in a given DS1 frame may be destined for different subscribers 700, they therefore must be routed over different PDNs 500. The DS0s in the incoming DS1 frames are therefore reframed as discussed in more detail below such that all DS0's in a given frame or series of frames have the same RU as their destination.

As a result of the reframing, individual DS0's within a given DS1 do not remain associated with the DS1 framing bit. A different mechanism to convey multiframe and alignment information is therefore required. The present signalling system provides the means by which this necessary signalling and alignment information can be conveyed to RU's 600.

In order to convey signalling and multiframe alignment information to RU's 600, a ninth bit having an identifiable data sequence patterned thereon (the Ninth Bit Signal, or NBS) is appended to each DS0 before they are reframed. The new, 9 bit channel format is referred to as a "DS0+" and is represented as follows:

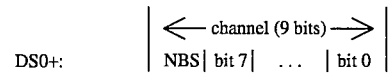

Figure 8:
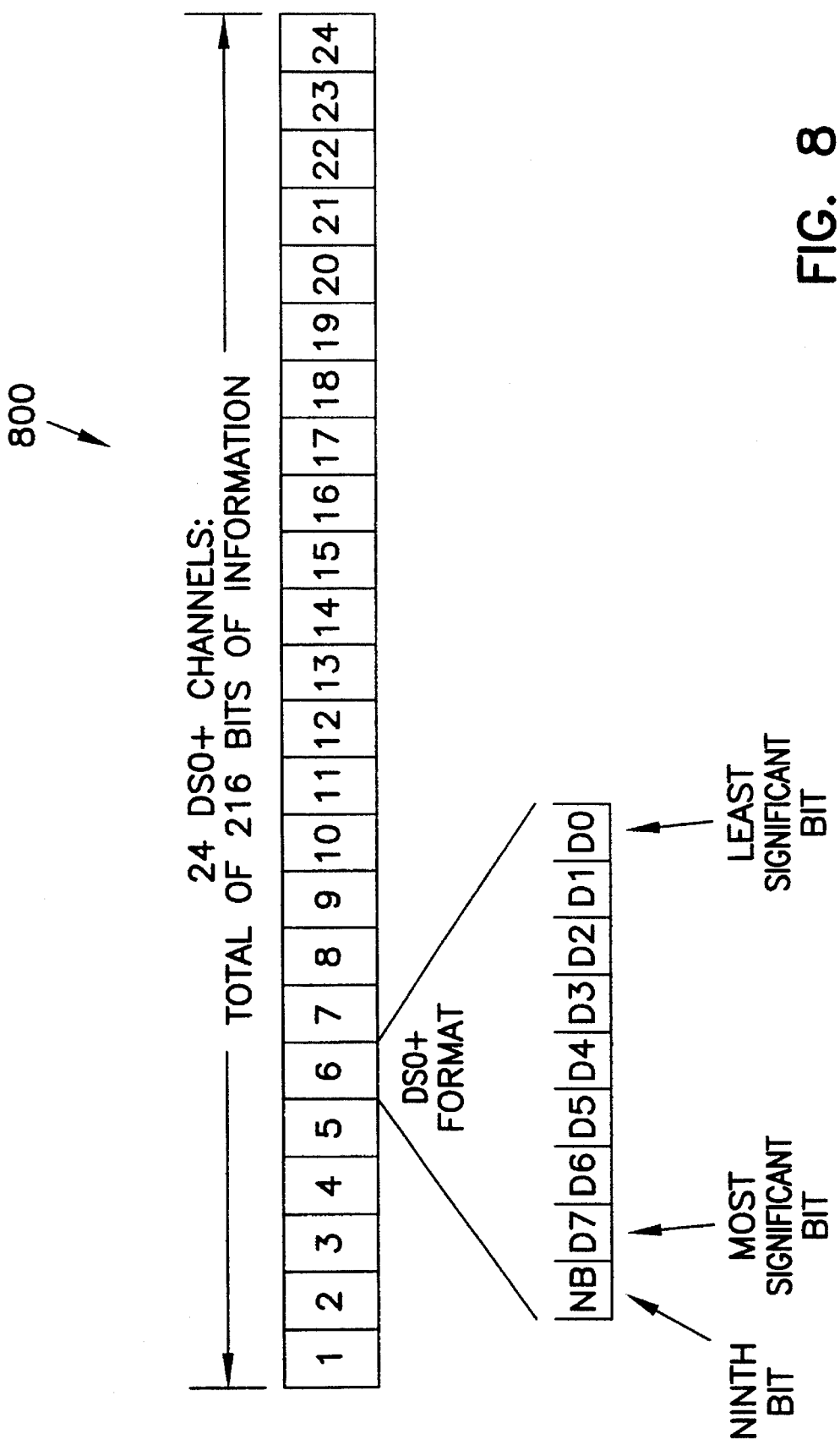
FIG. 8 shows a diagram of the modified framing format of the present signalling system.

Referring again to FIG. 1, DS1U's 400 append the NBS to each DS0 as described in more detail below. The resulting DS0+'s are then routed appropriately by Time Slot Interchange (TSI) 306, an NXM cross-connect switch of a type well known in the art. TSI 306 routes any of the N incoming DS0+ time slots to any of M outgoing DS0+ time slots. The DS0+'s are thus moved in both time (e.g. framing time slot) and space (e.g. particular frame). The routed DS0+'s are then transmitted to Distribution Unit 320 where they are multiplexed to form signals in the PDN framing format shown in FIG. 8. The PDN frame (PDNF) 800 is shown in FIG. 8 and comprises 24 DS0+ channels, for a total of 216 bits of information.

NBS Signalling Patterns

Table 2 shows the ninth bit signalling (NBS) patterns of the present signalling system for both the SF (AB) and the ESF (ABCD) in-band signalling formats and for the ESF out-of-band signalling format.

TABLE 2

| Frame # | In-Band Signalling Bit Value | | SF NBS (in-band) | ESF NBS (in-band) | ESF NBS (out ofband) |
|---|---|---|---|---|---|
| | AB | ABCD | | | |
| 1 | | | 1 | 1 | 1 |
| 2 | | | 1 | 1 | 1 |
| 3 | | | 1 | 1 | 1 |
| 4 | | | 0 | 0 | 0 |
| 5 | | | 0 | 0 | 0 |
| 6 | A | A | 0 | 0 | 0 |
| 7 | | | F | F | F |
| 8 | | | X | 0 | 1 |
| 9 | | | 0 | 0 | 0 |
| 10 | | | X | X | X |
| 11 | | | X | X | X |
| 12 | B | B | 0 | 0 | 0 |
| 13 | | | 1 | X | $X_A$ |
| 14 | | | 1 | X | $X_B$ |
| 15 | | | 1 | 0 | 0 |
| 16 | | | 0 | X | $X_C$ |
| 17 | | | 0 | X | $X_D$ |
| 18 | A | C | 0 | 0 | 0 |
| 19 | | | F | X | X |
| 20 | | | X | X | X |
| 21 | | | 0 | 0 | 0 |
| 22 | | | X | X | X |
| 23 | | | X | X | X |
| 24 | B | D | 0 | 0 | 0 |

For normal SF operation the NBS carries the pattern 1-1-1-0-0-0-0-X-0-X-X-0. For normal ESF operation the first twelve frames carry the same pattern as the 12 frame SF NBS, with the 13th through 24th frames having the pattern X-X-0-X-X-0-X-X-0-X-X-0. Thus the ESF framing format is distinguished from SF by the placement of a "1" in the NBS of the 15th frame, wherein the corresponding location in SF (repeated frame 3) contains a "0".

The "X" bits shown in the last column of Table 2 are not used in the present signalling system for conveying alignment or multiframing information, and are therefore available for several other purposes. In one embodiment of the present invention, the X bits are not used and are simply set to zero. In alternate preferred embodiments, the X bits can be used to form an additional data link as described below, used for out-of-band signalling as described below, or for various other purposes.

For out-of-band signalling in the ESF frame format, signalling information is transferred via the X bits instead of bit robbing from the sixth, twelfth, eighteenth and twenty-fourth frames. For the 24 frame ABCD patterns, a 0 in the eighth frame indicates In-Band signalling and a 1 in the eighth frame indicates Out-of-Band signalling. The $X_A$, $X_B$, $X_C$ and $X_D$ bits provide paths for the A,B,C and D signalling bits, respectively. The signalling bits are extracted from a common signalling channel and placed into the X bits. The NBS framing pattern is still used to locate multiframe information and as an integrity check on the subscriber loop path, as described above for the in-band case.

If an Out of Frame (OOF) or Loss of Signal (LOS) is detected on a DS1, all telecommunications systems are required by Bellcore PUB 43801-sec. 2.5 and TR-303-sec. 4.4.9, to implement a "Freeze", which is a well-known telecommunications standard to those of skill in the art. Freeze is a state in which the signalling condition from the RU just prior to the time of the error is frozen such that the channel remains in the same state as when the error occurred. Because RU's 600 do not have access to the LOS or OOF signals generated at HDT 300, the NBS of the present invention is used to convey freeze information. Thus if an OOF or LOS signal is detected at HDT the F-bit shown in Table 1 is set to 1. The SF freeze pattern of the preferred embodiment shown in Table 1 differs from the SF normal pattern only in that the NBS for frame 7 (the F bit) is a "0" under Normal conditions and a "1" during Freeze.

In a different application, NBS can be used as a data link. The entire DS1, including the framing bit, can be transported between the RU and DS1U. In this application, the NBS carries provisioning and control information downstream to the RU and performance information upstream from the RU. Since the framing bit and the DS1 signal are transmitted as a whole, alignment signalling information need not be carried in the NBS. In this data link mode the NBS carries a bit mapped signal that is used to provision and control RU 600.

Detailed Hardware Description

Figure 2:
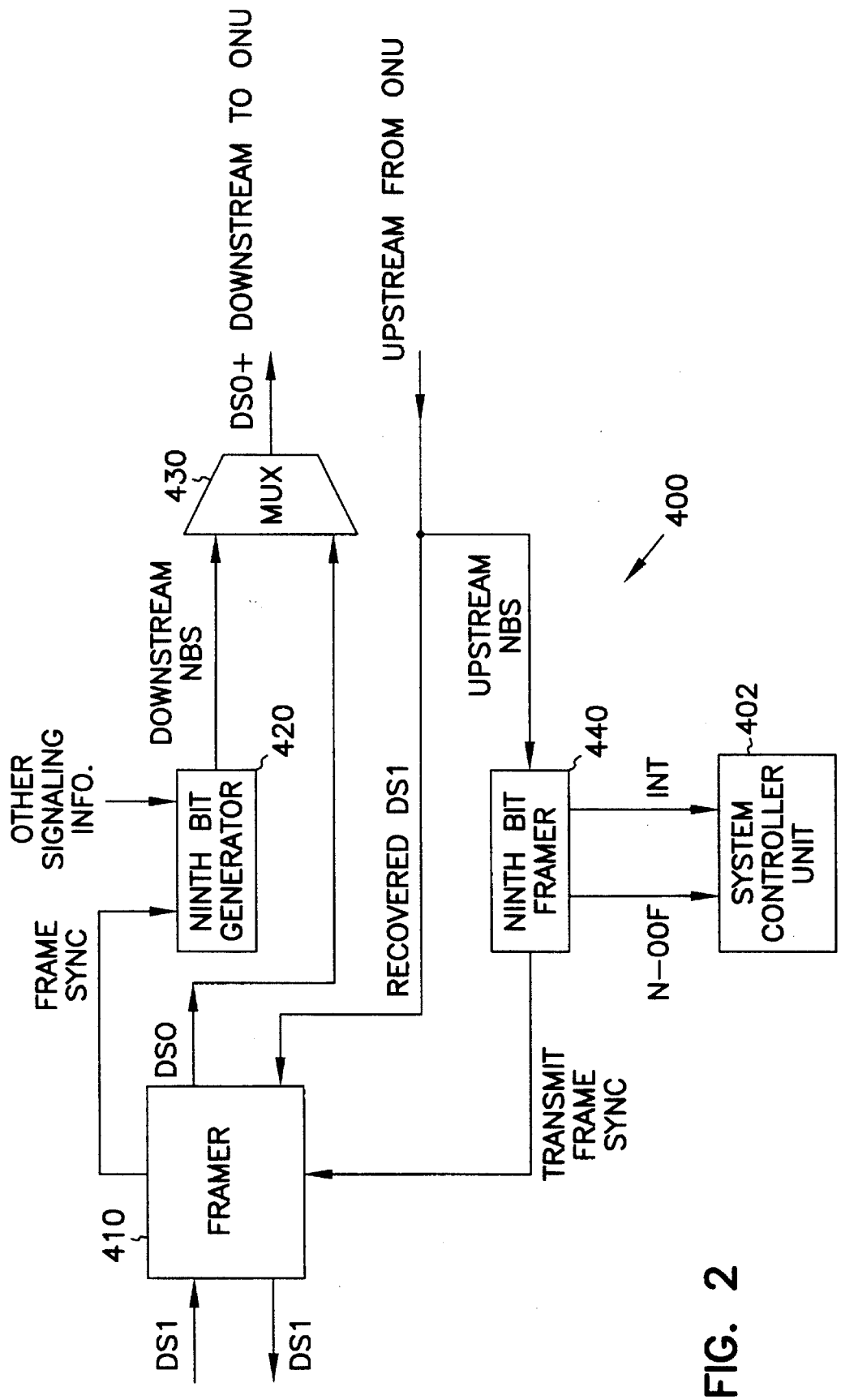
FIG. 2 shows a block diagram of a DS1U.

FIG. 2 shows a more detailed block diagram of a DS1U 400. DS1U's 400 append the appropriate NBS signalling pattern chosen from those described above to each DS0 in the downstream direction, and monitor the looped back NBS from the RU's in the upstream direction. In the downstream direction, framer 410, which is a commonly available DS1 framer chip, locates framing information on the received DS1's, and the framing alignment information is used to align ninth bit generator 420 via the signal FRAME SYNC. Software running in system controller unit 402 loads a 24 bit shift register located in ninth bit generator 420 with the appropriate NBS pattern chosen from those shown in Table 2. The values in the shift register are shifted out once per frame (e.g. at 8 KHz) one bit value per frame. For example, each NBS bit in each DS0 of the first frame of the SF or ESF framing format are set to "1". Each NBS bit in each DS0 of the second frame are set to "1", and similarly for the third frame. Each NBS bit in the fourth frame receives a "0" etc. These NBS bit values just described correspond to the first four NBS bit values shown in Table 1 (e.g., 1-1-1-0).

When used in data link mode, ninth bit generator 420 shifts out one bit per DS0+. In other words, all 24 bits having the ninth bit generator 420 shift register are shifted out and multiplexed into the downstream signal once per channel. If the shift register located in ninth bit generator 420 is not updated by system controller unit 402, then the same 24 bits are shifted out during the next 125 microsecond frame.

The alignment of the NBS signal is controlled by the signal FRAME SYNC such that the NBS signalling marker and the DS0 channels are multiplexed such that the output of mux 430 is in alignment with the incoming DS1. The resulting framing format which is transmitted over the PDNs 500 is shown in FIG. 8. The DS0's output from mux 430 are then sent to TSI 306 and DU 310 (shown and described above with respect to FIG. 1) where the frames to be sent to RU's 600 are created.

A freeze signal is placed on all NBS bits associated with DS1-X when a LOS or OOF on DS1-X in question is detected at HDT 300. Upon detection of either of these conditions ninth bit generator 420 automatically sends the NBS freeze signal shown in Table 2 (i.e. F bit=1) on all NBS bits of that data path. Ninth bit generator 420 resumes sending the normal AB or ABCD NBS signalling pattern once the LOS and OOF conditions are cleared.

RU Alignment

Figure 3:
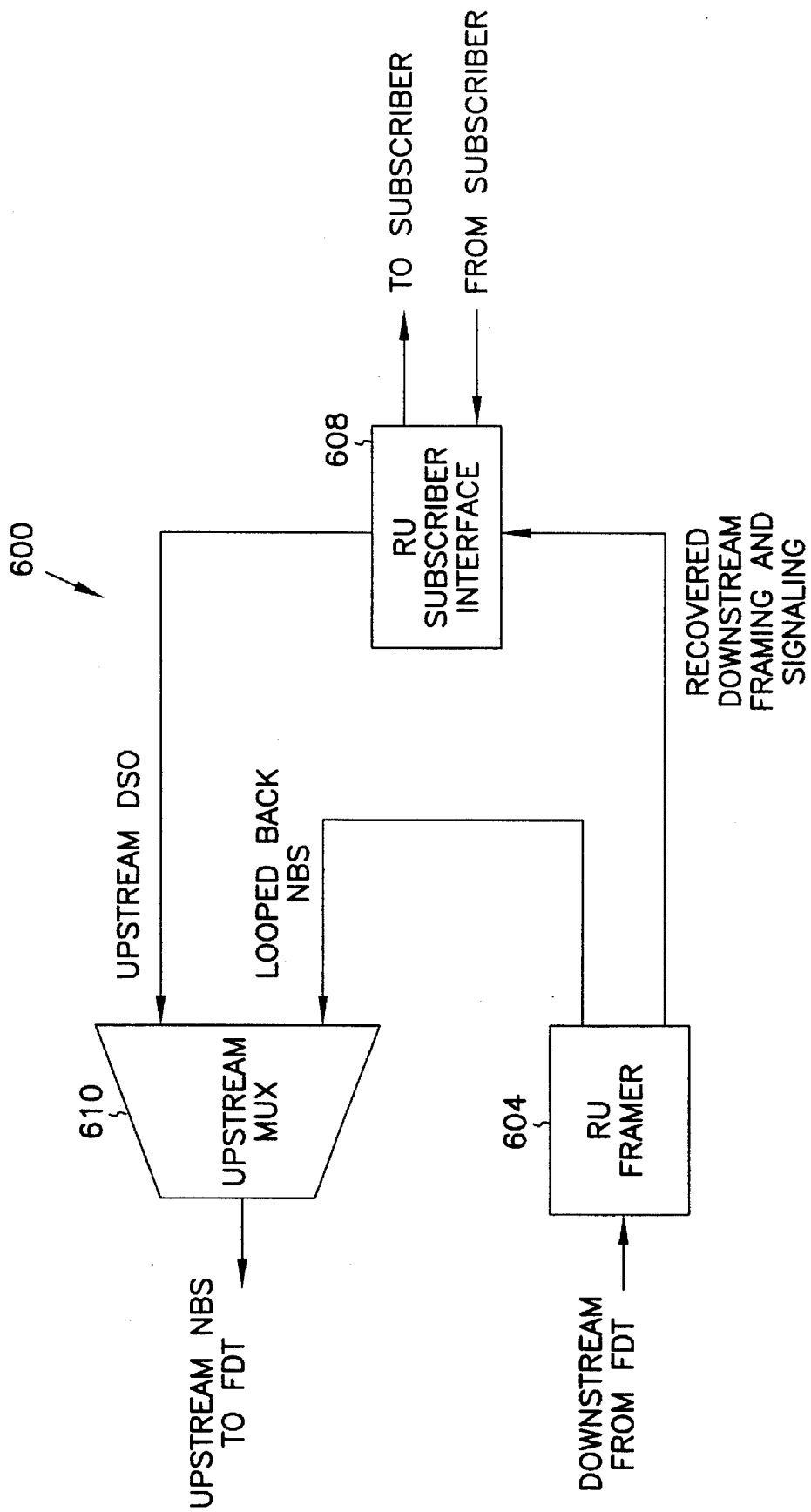
FIG. 3 shows a block diagram of a RU.

FIG. 3 shows a block diagram of an RU 600 which locates and aligns to the downstream NBS, and which loops the downstream NBS back into the upstream signal.

RU Framer 604 receives PDNF 800 of FIG. 8 which were created and transmitted by HDT 300 as described above. Correct alignment is maintained by RU Framer 604 which locates and aligns RU 600 to the downstream NBS as discussed below with respect to FIGS. 4 and 5. The recovered downstream DS0s or DS1 signal is forwarded to the subscriber 700 via RU/subscriber interface 608.

Figure 4:
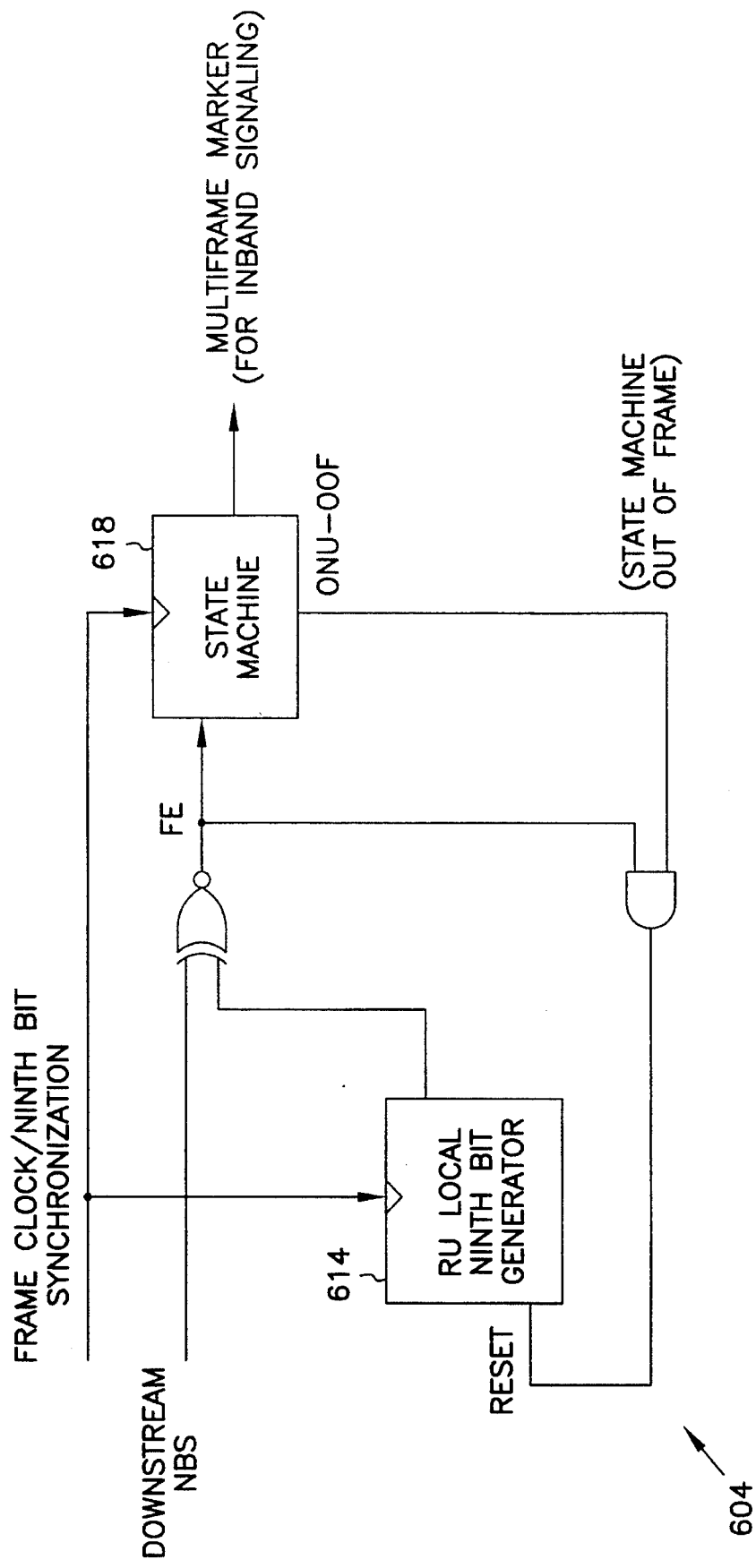
FIG. 4 shows a more detailed block diagram of the RU Framer.
Figure 5:
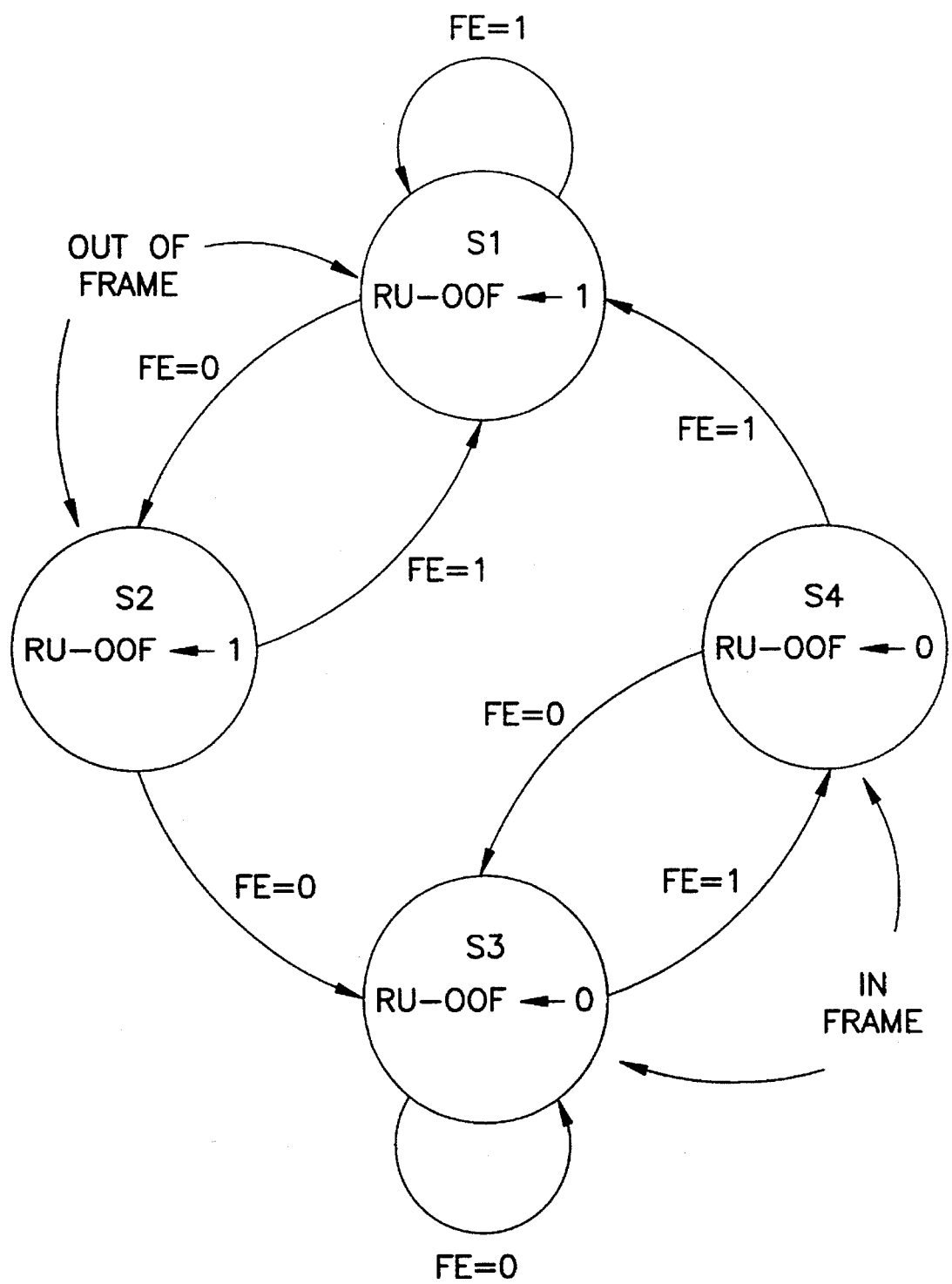
FIG. 5 shows a diagram of the state machine used for control of RU Framer.

The details of the operation of RU framer 604 will now be described with respect to FIGS. 4 and 5. FIG. 4 shows a more detailed block diagram of RU framer 604. FIG. 5 shows a state diagram which controls the operation of state machine 618.

State 1 of the state machine shown in FIG. 5 is the first RU out-of-frame (RU-OOF) state and indicates that the value output by RU local NBS generator 614 shown in FIG. 4 is not aligned to the received NBS. The signals are in alignment only when a comparison of the signals shows that the current NBS signal values are equal. The locally generated NBS and the received NBS are compared as shown in FIG. 4. If the two NBS signals are not equal, the output FE (Frame Error) of the exclusive-OR will be a logic high, or logic 1. As shown in FIG. 5, state machine 618 remains in state 1 when FE=1. When in state 1, the signal RU-OOF is output from state machine 618 and is ANDed with the FE signal as shown in FIG. 4. If both the FE signal and RU-OOF signals are high, the result of the AND will also be high, causing a reset of RU local NBS generator. This reset causes the alignment of the locally generated NBS to shift. The shifted locally generated NBS are then continually compared and shifted until the alignments match (FE=0). When the two signals are equal, FE goes to 0 causing the state machine to move from state 1 to state 2.

State 2—This is the second N-OOF state and indicates that a correct comparison of the local NBS to the received NBS has occurred. However, when in state 1 RU-OOF is still driven high. State 2 continues to compare the locally generated NBS to the received NBS. When there is a correct comparison of the locally generated NBS to the received NBS during the next comparison window, FE goes to 1 causing a move from state 2 to state 3. If the locally generated NBS and the received NBS do not compare, FE=0 and state 1 is reentered. In this way, short-term (within one multiframe) error bursts cannot cause false-framing.

State 3—This is the first in-frame state and indicates that RU framer 604 has correctly aligned to the received NBS. Thus, in state 3 the RU-OOF signal is driven low. While in state 3 RU framer 604 continues to compare the received NBS to the locally generated NBS as long as FE=0. If the two signals do not compare, then FE=1 causes a move from state 3 to state 4.

State 4—This is the second in-frame state and indicates that RU framer 604 has detected an error in the comparison of the received NBS to the local NBS during the comparison window (i.e., FE=1 in state 3). If during the next comparison, the locally generated NBS and the received NBS still do not compare, then state 4 is left and state 1 is entered. Otherwise, if during the next comparison the locally generated NBS and the received NBS in the selected channel do compare, then state 4 is left and state 3 is reentered. In this way, short-term (within one multiframe) error bursts are allowed without causing state machine 618 going out of frame.

To transmit information from the subscriber to HDT 300, ONU Subscriber Interface 608 receives a DS0 signal from the subscriber in-house telephone lines. The downstream NBS as received from the HDT 300 is inserted into the upstream frame by multiplexing the downstream NBS with the upstream DS1 signal to create the framing format shown and described with respect to FIG. 8.

DS1U Alignment

Referring again to FIG. 2, each upstream DS0+ signal sent by RUs 600 is received by DS1U 400. Null bits and the looped back Ninth Bit Signal (NBS) are extracted from the bitstream. The looped back NBS are input to ninth bit framer 440. The remaining 193 bits of the upstream signal (e.g. the recovered DS1 signal) is sent to framer 410. Data signals pass through framer 410 which inserts the correct DS1 framing bits according to the alignment it receives via Transmit Frame Sync. From framer 410 the signal is transmitted to LDS 200.

Figure 6:
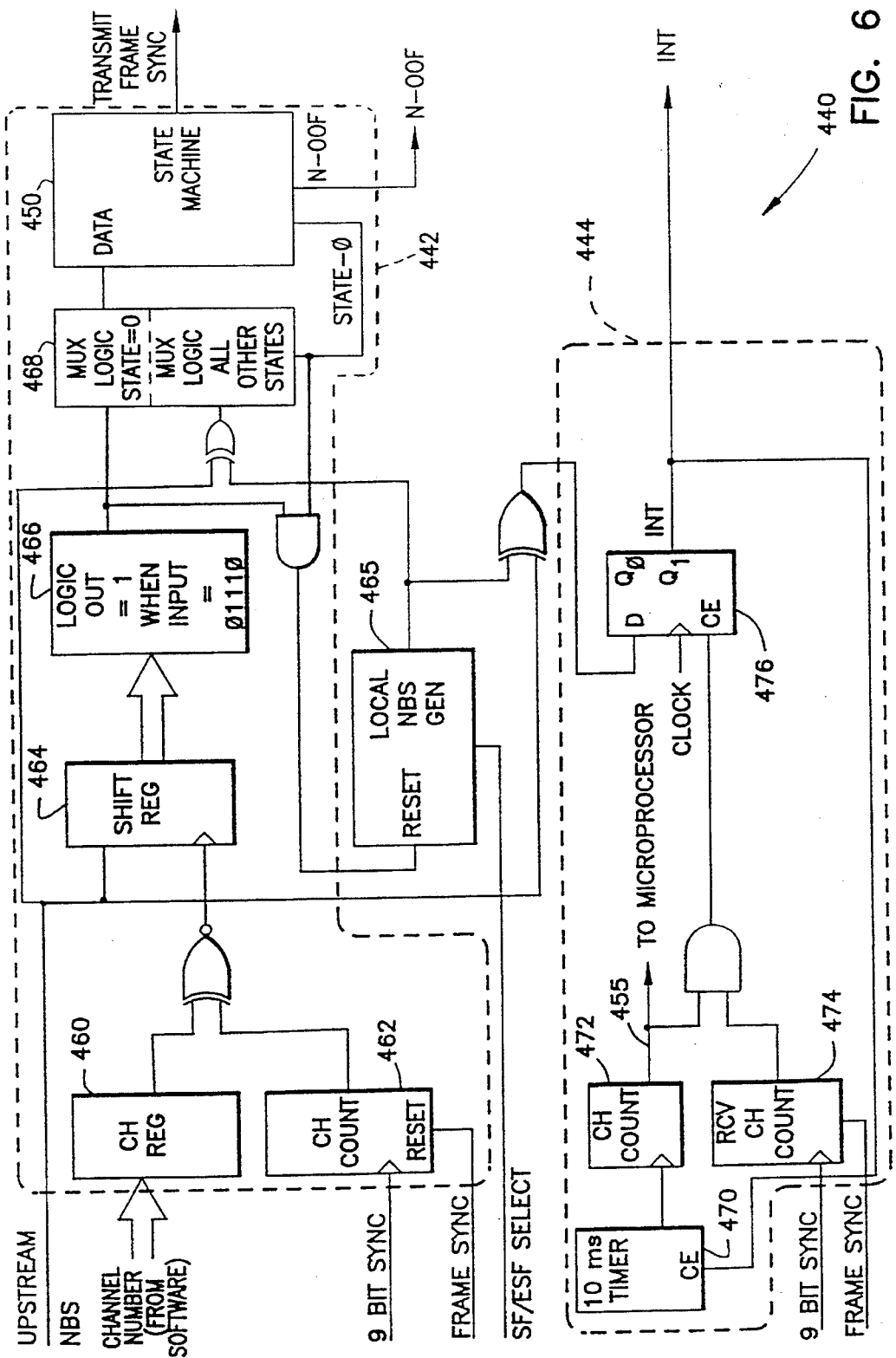
FIG. 6 shows a block diagram of one of the traffic paths through a DS1U.

Correct alignment is maintained by ninth bit framer 440. FIG. 6 shows a more detailed block diagram of ninth bit framer 440. Phantom line 442 represents a portion of ninth bit framer referred to as the alignment framer. The portion of the ninth bit framer represented by phantom line 444 is referred to as the scanning framer. The purpose of alignment framer 442 is to monitor the NBS of a selected DS0+. Scanning framer 444, at 10 millisecond per channel intervals, scans through all the channels sequentially, and loads the channel numbers into channel register 472.

The operation of alignment framer 442 will now be explained. Channel count 462 is a counter which, depending on the signals 9 BIT SYNC (occurs every NBS time slot) and FRAME SYNC (occurs at beginning of each frame) produces a signal which indicates when the current channel number is available. FRAME SYNC resets channel counter 462 every frame, and channel counter 462 is incremented each time a 9 BIT SYNC signal is received. The value in channel count 462 is compared with the channel value in channel register 460. Software running in system controller unit 402 (shown in FIGS. 1 and 2) controls which channel number is to be monitored by alignment framer 442 and loads the appropriate channel number into channel register 460.

The result of this comparison is used to clock the upstream (looped-back) NBS into serial-to-parallel shift register 464. At the output of shift register 464, combinational logic 466 outputs a logical 1 when its input is the pattern 01110 (the beginning of the NBS pattern) to signal mux logic 468 that the beginning of the pattern for the particular channel which was loaded by system controller unit 402 into channel register 460 has been identified. This means that the state machine 450 is in state-0 (as will be described below). In states 1–3, the upstream and local NBS are compared and input to Mux 468, as will be described below.

Mux logic 468 and state machine 450 find and maintain the alignment of local NBS generator 465 and the received upstream NBS. The output of state machine 450 is the signal N-OOF (ninth bit out of frame). N-OOF disables the interrupt (INT) signal from scanning framer 444 so that when alignment framer 442 is out of alignment, system controller unit 402 is not unnecessarily interrupted by the scanning framer.

Figure 7:
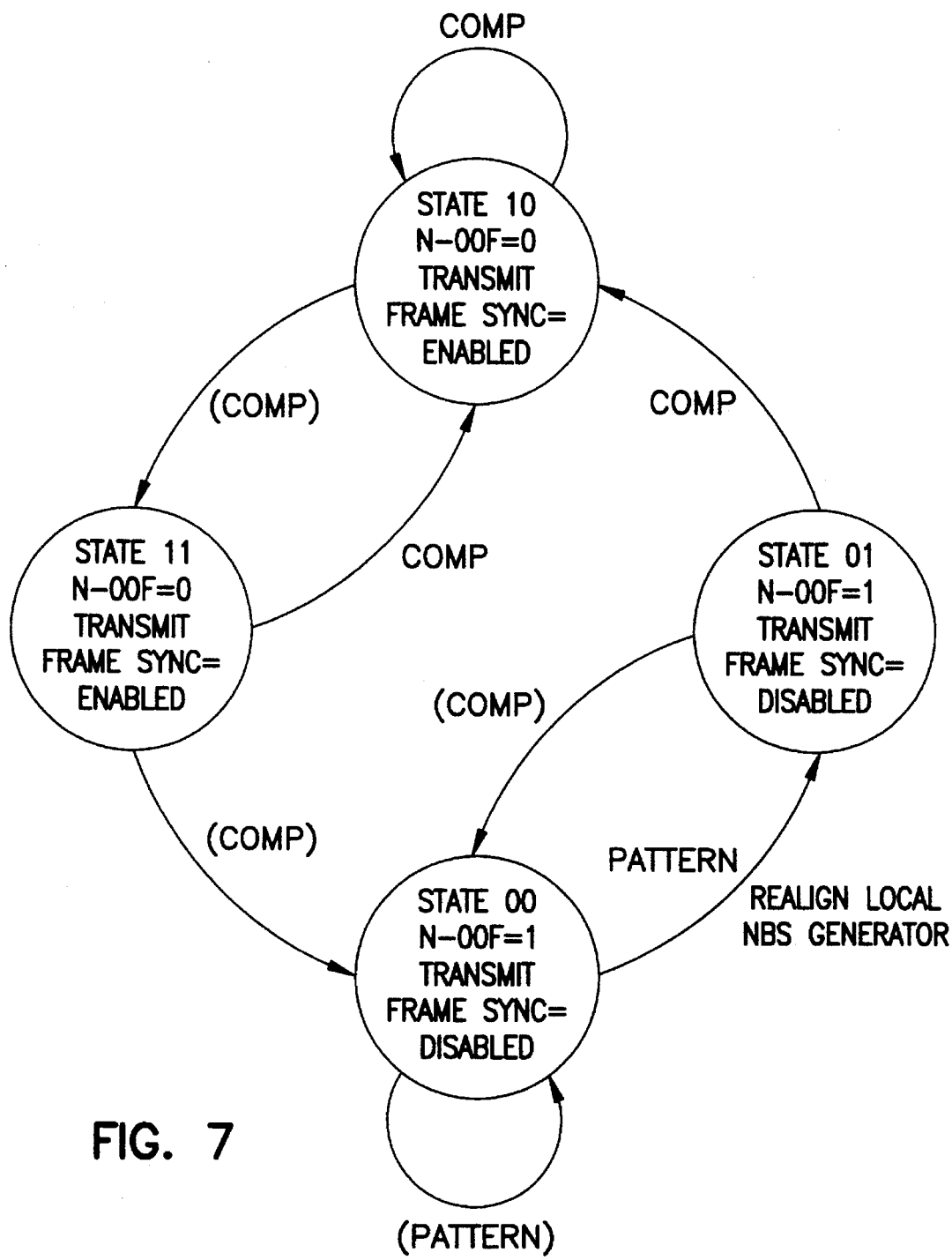
FIG. 7 shows a diagram of the state machine used for control of alignment and scanning framers.
Figures 7A, 7B:
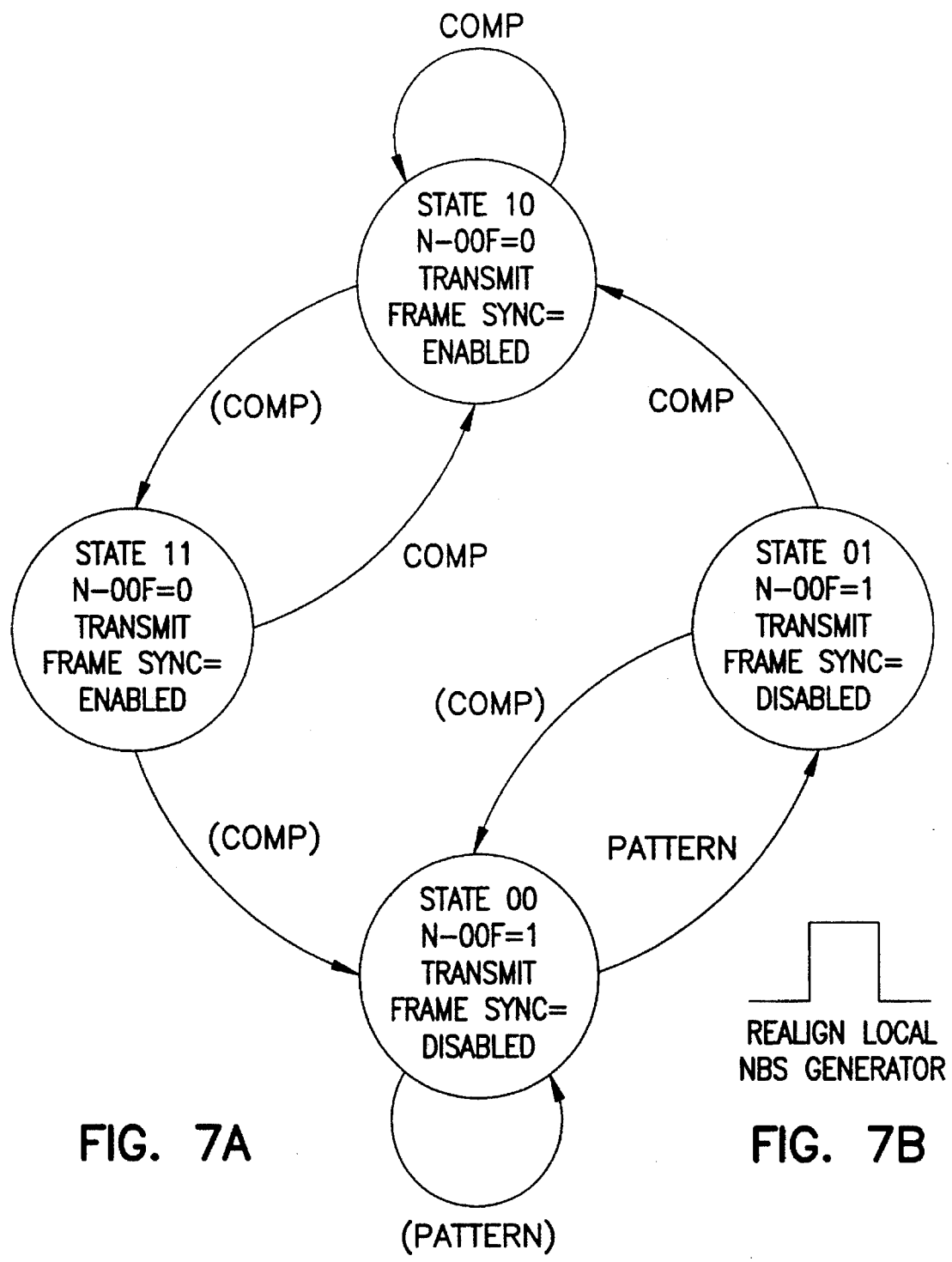

FIG. 7 shows a state diagram for state machine 450 of alignment framer 442. COMP indicates that a correct comparison of the locally generated NBS and received upstream NBS occurred. (COMP) indicates that these signals did not compare. PATTERN indicates that the beginning of the received NBS pattern has been identified.

State 0—This is the first N-OOF state and indicates that alignment framer 442 has not been able to locate the beginning of the NBS for the selected channel. When in this state local NBS generator 465 is allowed to run at its previous phase alignment and is not compared to the received NBS in the selected channel. When alignment framer 442 has located the beginning of the NBS in the received channel (by combinational logic 466 searching for the unique pattern at the beginning of the NBS) state 0 will be left and state 1 will be entered. It is during this transition that the phase of local NBS generator 420 is realigned. This is the only time that the local NBS phase is realigned and thus local NBS generator 465 may run uninterrupted during all other times, minimizing the disruption of the operation of scanning framer 444. During state 0 N-OOF is driven high, causing an interrupt to system controller unit 402 and disabling the Transmit Frame Sync signal to framer 410.

State 1—This is the second N-OOF state and indicates that alignment framer 442 has located the beginning of the NBS for the selected channel and is waiting for a correct comparison of the local NBS to the received NBS in the selected channel during the comparison window. As mentioned previously, as this state is entered the local NBS phase is realigned and state 1 will now compare the local NBS generator to the received NBS in the selected channel. When alignment framer 442 has verified that it has located the correct NBS phase alignment by the correct comparison of the local NBS to the received NBS in the selected channel during the comparison window, state 1 is left and state 2 is entered. If, during the comparison window, the local NBS and the received NBS in the selected channel do not compare, then state 0 is re-entered. In this way, short-term (within one multiframe) error bursts cannot cause false-framing. When in state 1 N-OOF is still driven high and the Transmit Frame Sync signal is still disabled to the framer 410.

State 2—This is the first in-frame state and indicates that alignment framer 442 has correctly aligned to the received NBS on the selected channel. While in this state alignment framer 442 continues to compare the received NBS to the local NBS during the comparison window. During the comparison window, if the two do not compare then state 2 is left and state 3 is entered. When in state 2 the N-OOF line is driven low enabling the Transmit Frame Sync signal to framer 410 and enabling software to clear the N-OOF interrupt condition.

State 3—This is the second in-frame state and indicates that alignment framer 442 has detected an error in the comparison of the received NBS to the local NBS during the comparison window. If, during the next comparison window, the local NBS and the received NBS in the selected channel still do not compare, then state 3 is left and state 0 is entered. If, during the next comparison window, the local NBS and the received NBS in the selected channel do compare then state 3 is left and state 2 is re-entered. In this way, short-term (within one multiframe) error bursts are allowed without going N-OOF. When in state 3 the N-OOF line is still driven low enabling the Transmit Frame Sync signal to framer 410.

It is important to understand why the local NBS phase is realigned during the transition from state 0 to state 1 and not during the transition from state 1 to state 2. If alignment framer 442 is in state 0, locates the beginning of the received NBS in the selected channel and goes to state 1, then there must be an additional frame counter to tell alignment framer 442 when to look for the beginning of the received NBS pattern in the selected channel again. By realigning the local NBS generator 465 after the first detection of the beginning of the received NBS in the selected channel (during the transition from state 0 to state 1), then local NBS generator 465 may be used for the comparison and the counter eliminated. This does mean that in a high error rate condition the local NBS generators phase may be constantly realigned as the state machine transitions from state 0 to state 1 and back again. However, during this condition, N-OOF is logic high and software should ignore all interrupts from scanning framer 444.

Once alignment framer 442 has framed to the NBS on the selected channel, it continuously forces this framing alignment to framer 410 (shown in FIG. 2) via the signal Transmit Frame Sync. The framer alignment will be reasserted after each full NBS pattern (i.e., every 12 frames for SF and every 24 frames for ESF) to reinforce framing alignment.

Scanning framer 444 sequentially and continuously monitors the NBS of all DS0+s. It is a hardware scanner that sequentially monitors each DS0+ to determine whether each channel shares the same NBS alignment as alignment framer 442. If it determines that a channel is unprovisioned (carries all zeros) or has a valid NBS in alignment with alignment framer 440, scanning framer 444 outputs that channel number to software as a valid channel, and then monitors the next channel.

A detailed description of the operation of scanning framer 444 will now be given. 10 millisecond timer 470 drives channel counter 472 which counts through channel numbers 1–24 at 10 millisecond intervals. Receive channel counter 474 operates in the same manner as channel counter 462 in the alignment framer, i.e., FRAME SYNC resets receive channel counter 474 every frame and 9 BIT SYNC increments the count each NBS time slot.

When channel count 472 and receive channel count 474 compare, counter 476 is enabled. Counter 476 is incremented if the upstream NBS and the locally generated NBS are not equal, i.e., when the channel number currently in question does not match the locally generated NBS. If more than two errors occur, the particular channel is in error, the scanning framer generates an interrupt (INT), and the corresponding channel number is presented to the microprocessor. The interrupt (INT) signal feeds back to the clock enable of the 10 millisecond timer to freeze the channel count so that the channel in error can be identified.

After software running in system controller unit 402 services the interrupt, scanning framer 444 continues the scanning process by sequentially monitoring each channel, at 10 ms per channel intervals, until all channels have been scanned, comparing the current upstream NBS to the locally generated NBS and generating an interrupt if the channel is out of phase and outputting the appropriate channel number. It then starts over and scans all channels again. In the preferred embodiment, a full scan of each channel takes approximately 10 ms. A full scan of an entire frame therefore takes approximately 240 ms (24 channels×10 ms per channel). If a given channel remains in error it will cause an interrupt every scan. Thus if each channel is in error, for example, interrupts are created at approximately 10 ms intervals.

If no interrupts are generated after a complete scan of all provisioned channels, then all the provisioned channels in the upstream signal share the same alignment. If interrupts are generated the associated channel numbers are mapped by system controller unit 402. After a scan of all channels, the interrupt map is compared to a map of provisioned channels. If the alignment framer is not aligned with a majority of provisioned channels, a different channel number for alignment framer to align to is chosen by control software running in system controller unit 402 and loaded into channel register 460 in alignment framer 442.

Scanning framer 444 does not give valid results unless the N-OOF signal as output by alignment framer 442 is low (meaning that the alignment framer is aligned to the software selected channel). Interrupts from scanning framer 444 can be masked in the preferred embodiment. This should be part of the initialization procedure to prevent unwanted interrupts.

Although specific hardware, software configurations and state diagrams have been illustrated and described with respect to the preferred embodiment of the present invention, it will be appreciated by those of ordinary skill in the art that a wide variety of software or firmware implementations calculated to achieve the same purposes maybe substituted for the specific embodiment shown and described. Thus, although conventional subroutines, decisions and control flow have been described, those skilled in the art will readily recognize that the substitution of a wide variety of alternate control flows, interrupt driven routines, external control mechanisms, and the use of hardware control as opposed to software control could be used without deviating from the spirit and scope of the present invention. Those experienced in the telecommunications art will readily appreciate that the present invention may be implemented in a very wide variety of embodiments.

It will therefore be readily apparent to those skilled in the art that many modifications to the preferred embodiment of the present invention as described herein are possible without deviating from the scope and spirit of the present invention. Special conditions employed for the implementation of the preferred embodiment discussed herein are not intended to be limiting and are easily adaptable to alternate implementations. For example, the control structure of the present invention is generally implemented using microprocessor based architectures and logic functions. It will be readily understood by those of skill in the art upon reading and understanding this specification and drawings that the control structure of the present invention may be implemented in a wide variety of ways, including the use of external computer control, RAM microcode control, PLA or PAL logic structures, and other types of hardwired or software controlled state machines. Those skilled in the telecommunication art will readily recognize the fact that such changes would not be outside the scope of the present invention.

Therefore it shall be understood that this application is intended to cover any adaptations or variations thereof. Therefore, it is manifestly intended that this invention be limited only by the claims and the equivalents thereof.

We claim:

1. In a telecommunications system including a conventional telephone network and a passive distribution network, the conventional telephone network employing a signal format comprised of frames, each frame comprised of a group of n-bit channel samples and at least one framing bit, the framing bit of each frame having an associated location and state such that a plurality of the framing bits in a succession of frames define multiframe and alignment information, and wherein the passive distribution network connects a head end and a plurality of remote ends, the passive distribution network employing a modified signal format comprised of modified frames, each modified frame not including the framing bit, a system for transmitting the multiflame and alignment information between the head end and the remote ends, comprising:

an input circuit in the head end connected to receive the frames from the conventional telephone network;

a framing bit monitoring circuit adapted to determine the location and state of the plurality of flaming bits in the received flames to determine the multiframe and alignment information for the received frames;

an added-bit generator under control of the framing bit monitoring circuit and adapted to output a sequence of bits having a preselected pattern imposed thereon in an alignment controlled by the location and state of the plurality of framing bits, wherein the preselected pattern is representative of the multiframe and alignment information; and a multiplexor, connected to receive the n-bit channel samples of the received frames from the flaming bit monitoring circuit and the sequence of bits from the added-bit generator, and having an output signal comprised of the modified frames of the modified signal format, each modified frame comprised of a group of modified channel samples, each modified channel sample comprised of an n-bit channel sample having at least one bit of said sequence of bits appended thereto.

2. The apparatus according to claim 1 wherein the remote end further includes means, connected to receive the modified channel samples, for receiving and monitoring the additional bits, and further for locating the additional bit pattern to obtain the multiframing and alignment information.

3. The system of claim 2 further including means at the remote end for looping the received additional bits having the preselected pattern thereon from the remote end back to the head end over an upstream data path.

4. The system of claim 3 further including means at the head end for receiving the looped back additional bits from the remote ends over the upstream data path, and for monitoring the pattern to ensure integrity of the downstream and upstream data paths.

5. The system according to claim 1 wherein certain of the added bits are used for out-of-band signalling.

6. The system according to claim 1 wherein the added bits are used as a data link.

7. The system according to claim 1, wherein said head end further includes framer means for aligning an outgoing communications signal to an upstream signal based on the alignment of the sequence of bits having a preselected pattern, said communications signal employing the signal format comprised of frames, each frame comprised of a group of n-bit channel samples and at least one framing bit.

8. The system according to claim 7, wherein said framer means further includes:

local generator means for generating a local bit sequence having the sequence of bits having the preselected pattern;

alignment means, connected to receive the upstream signal and the locally generated bit sequence, for aligning the locally generated bit sequence with the sequence of bits having the preselected pattern of the upstream signal; and scanning means, connected to receive the locally generated bit sequence and connected to the alignment means, for scanning through all of the channels in the upstream signal to determine whether a predetermined number of channels are of the same alignment as the alignment means, and for loading a new channel number into the alignment means if less than the predetermined number of channels are of the same alignment as the alignment means so that the alignment means aligns to a different channel.

9. A signalling system for transmission of multiflame and alignment information in a channelized communications system, the communications system including a central office which outputs communications signals employing a signal format comprised of a group of frames, each frame comprised of a plurality of channel samples and a framing bit, the flaming bit of each frame having an associated location and state such that a plurality of framing bits in a succession of flames define multiframe and alignment information, the system further including a head end connected to a plurality of remote ends, comprising:

means in the head end for receiving the group of frames from the central office and for monitoring the plurality of framing bits;

bit generator means, responsive to the location and state of the plurality of framing bits, for generating an additional bit for each channel sample in the received group of frames, the additional bit for each channel sample is selected such that a plurality of additional bits form a preselected pattern representative of the multiframe and alignment information;

means for appending the plurality of additional bits to the channel samples and for extracting the plurality of framing bits and producing therefrom a plurality of modified channel samples; and routing means for sending the modified channel samples to their respective appropriate remote ends.

10. A method of conveying signalling information in a communications system comprised of a central office which outputs communication signals employing a signal format comprised of a plurality of frames, each frame comprised of a plurality of channel samples and a framing bit, the framing bit of each frame having an associated location and state such that a plurality of framing bits in a succession of frames have signalling information encoded therein, the communications system further comprised of a head end and a plurality of remote ends, comprising the steps of:

(a) receiving the plurality of frames at the head end from the central office;

(b) monitoring the location and state of each framing bit in the received plurality of frames;

(c) generating a series of bits in one of a plurality of signalling patterns, each signalling pattern representative of signalling information;

(d) extracting the plurality of framing bits from the plurality of frames:

(e) sequentially appending, according to the location and state of the framing bit, at least one bit in the series of bits to each channel sample to create modified channel samples;

(f) routing each of the modified channel samples from the head end to the respective remote ends;

(g) receiving the modified channel samples at the remote ends; and (h) monitoring the signalling pattern at the remote ends to locate the signalling information.

11. The method according to claim 10, further including the steps of:

(i) looping the appended bits back to the head end; and (j) monitoring the signalling pattern of the looped back bits at the head end to ensure integrity of outgoing and return data paths and to locate upstream multiframe and alignment information.

12. The method according to claim 11 further including the step of:

(k) aligning an outgoing signal to an upstream signal based on an alignment of the signalling pattern imposed on the additional bit.

13. The method according to claim 12 further wherein the aligning step (k) further includes the steps of:

(k1) loading a channel number;

(k2) locating the beginning of the signalling pattern of the upstream signal for that channel number;

(k3) comparing the alignment of the signalling pattern of the upstream signal for that channel number to an alignment of a locally generated bit sequence having the same signalling pattern imposed thereon;

(k4) realigning the signalling pattern of the locally generated bit sequence if the signalling patterns of the locally generated bit sequence and the upstream signal are not aligned, and repeating comparing (k3) and realigning (k4) steps for as long as they are not aligned;

(k5) enabling an alignment output signal if the signalling patterns of the locally generated bit sequence and the upstream signal are aligned;

(k6) loading a next channel number; and (k7) repeating steps (k2) through (k6) until all of the channels are aligned.

14. The method according to claim 10 wherein an alignment of the signalling pattern of the appended bits is controlled by an alignment of the plurality of framing bits on the plurality of frames.

15. The method according to claim 10 further including the step of using certain of the appended bits for out-of-band signalling.

16. The method according to claim 10 further including the step of using the appended bits to provide a data link.

* * * * *

UNITED STATES PATENT AND TRADEMARK OFFICE
CERTIFICATE OF CORRECTION

PATENT NO. : 5,528,579

DATED : June 18, 1996

INVENTOR(S) : Mark A. Wadman et al.

It is certified that error appears in the above-identified patent and that said Letters Patent is hereby corrected as shown below:

Column 12, line 24, delete "multiflame" and insert therefor --multiframe--.

Column 12, line 30, delete "flaming bits" and insert therefor --framing bits--.

Column 12, line 31, delete "flames" and insert therefor --frames--.

Column 13, line 34, delete "flaming bit" and insert therefor --framing bit--.

Column 13, line 37, delete "flames" and insert therefor --frames--.

Signed and Sealed this

Fourteenth Day of January, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,528,579

DATED : June 18, 1996

INVENTOR(S) : Wadman et al.

It is certified that error appears in the above-identified patent and that said Letters Patent is hereby corrected as shown below:

In column 3, line 28, please replace "PON's" with "PDNs";

In column 3, line 29, please replace "FUs" with "DUs".

In column 12, line 49, please replace "apparatus" with --system--.

In column 12, line 51, please replace "the additional bits" with --additional bits--.

In column 12, line 52, please replace "locating the" with --locating--.

In column 13, line 28, please replace "multiflame" with --multiframe--.

Signed and Sealed this

Sixth Day of January, 1998

*Attest:*

BRUCE LEHMAN

*Attesting Officer*  Commissioner of Patents and Trademarks